United States Patent
Kumar et al.

(10) Patent No.: US 12,200,793 B2
(45) Date of Patent: Jan. 14, 2025

(54) METHOD AND SYSTEM FOR HPLMN-BASED TRAFFIC CONTROL WHEN UE IS REGISTERED ON DIFFERENT PLMNS

(71) Applicant: Samsung Electronics Co., Ltd., Suwon-si (KR)

(72) Inventors: Lalith Kumar, Bangalore (IN); Kailash Kumar Jha, Bangalore (IN); Govind Irappa Uttur, Bangalore (IN); Shweta M, Bangalore (IN); Vikrant Bajaj, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/132,853

(22) Filed: Apr. 10, 2023

(65) Prior Publication Data

US 2023/0247705 A1 Aug. 3, 2023

Related U.S. Application Data

(63) Continuation of application No. 16/963,549, filed as application No. PCT/KR2019/007551 on Jun. 21, 2019, now Pat. No. 11,627,622.

(30) Foreign Application Priority Data

Jun. 21, 2018 (IN) .............................. 201841023269
Jun. 19, 2019 (IN) .............................. 201841023269

(51) Int. Cl.
*H04W 76/16* (2018.01)
*H04W 8/12* (2009.01)
(Continued)

(52) U.S. Cl.
CPC ............ *H04W 76/16* (2018.02); *H04W 8/12* (2013.01); *H04W 8/24* (2013.01); *H04W 28/10* (2013.01); *H04W 60/00* (2013.01); *H04W 84/042* (2013.01)

(58) Field of Classification Search
CPC ....... H04W 76/16; H04W 8/24; H04W 60/00; H04W 28/10; H04W 8/12; H04W 84/042;
(Continued)

(56) References Cited

U.S. PATENT DOCUMENTS

2017/0290082 A1   10/2017   Salkintzis
2018/0124641 A1   5/2018    Salkintzis
(Continued)

FOREIGN PATENT DOCUMENTS

CN   101472262 A     7/2009
WO   2017176790 A1   10/2017

OTHER PUBLICATIONS

International Search Report and Written Opinion of the International Searching Authority in connection with International Application No. PCT/KR2019/007551 dated Oct. 1, 2019, 9 pages.
(Continued)

*Primary Examiner* — Congvan Tran

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments herein provide a method for
(Continued)

HPLMN-based traffic control in a wireless communication network when a UE 300 is registered on different PLMNs.

22 Claims, 10 Drawing Sheets

(51) Int. Cl.
  *H04W 8/24* (2009.01)
  *H04W 28/10* (2009.01)
  *H04W 60/00* (2009.01)
  *H04W 84/04* (2009.01)

(58) Field of Classification Search
  CPC ............... H04W 76/25; H04L 65/1073; H04L 65/1069; H04L 65/1095
  See application file for complete search history.

(56) References Cited

U.S. PATENT DOCUMENTS

| | | |
|---|---|---|
| 2018/0279397 A1 | 9/2018 | Faccin et al. |
| 2019/0044980 A1 | 2/2019 | Russell et al. |
| 2019/0268276 A1 | 8/2019 | Lee et al. |
| 2020/0128471 A1* | 4/2020 | Liu .................. H04W 40/02 |
| 2020/0245284 A1 | 7/2020 | Hans |
| 2020/0336940 A1* | 10/2020 | Salkintzis ......... H04W 28/0942 |
| 2021/0219371 A1* | 7/2021 | Youn .................. H04W 48/18 |
| 2021/0410010 A1* | 12/2021 | Salkintzis ............. H04W 76/15 |

OTHER PUBLICATIONS

3GPP TR 23.793 V0.5.0 (Jun. 2018), Technical Report, 3rd Generation Partnership Project; Technical Specification Group Services and System Aspects; Study on Access Traffic Steering, Switching and Splitting support in the 5G system architecture (Release 16), Jun. 2018, 68 pages.
Intel, "Solution for the differentiation of 3GPP RATs in ATSSS rule," S2-183640 (revision of S2-18xxxx), SA WG2 Temporary Document, 3GPP SA WG2 WG2 Meeting #127, Apr. 16-Apr. 20, 2018, Sanya, China, 8 pages.
LG Electronics, "ATSSS Solution—Capability negotiation," S2-180528 (revision of S2-18xxxx), SA WG2 Temporary Document, SA WG2 Meeting #125, Gothenburg, Sweden, Jan. 22-26, 2018, 2 pages.
Nokia, et al., "Selection mode transfer over N11 and N16 (wildcard DNN)," S2-181704 (revision of S2-181704), SA WG2 Meeting #126, Montreal, Canada, Feb. 26-Mar. 2, 2018, 14 pages.
Supplementary European Search Report dated Dec. 15, 2020, in connection with European Application No. 19823166.4, Dec. 15, 2020, 14 pages.
3GPP TS 23.501 V15.2.0 (Jun. 2018), Technical Specification, 3rd Generation Partnership Project; Technical Specification Group Services and System Aspects; System Architecture for the 5G System; Stage 2 (Release 15), Jun. 2018, 217 pages.
3GPP TS 23.502 V15.2.0 (Jun. 2018), Technical Specification, 3rd Generation Partnership Project; Technical Specification Group Services and System Aspects; Procedures for the 4G System; Stage 2 (Release 15), Jun. 2018, 308 pages.
Korean Intellectual Property Office, "Office Action" issued Oct. 21, 2021, in connection with Korean Patent Application No. 10-2020-7036353, 14 pages.
LG Electronics et al., "Clarification on PDU Session Establishment Procedure" S2-183582, 3GPP TSG-SA WG2 Meeting #127, Sanya, China, Apr. 16-20, 2018, 14 pages.
Korean Intellectual Property Office, "Notification of a Decision of Patent" dated Apr. 19, 2022, in connection with counterpart Korean Patent Application No. 10-2020-7036353, 8 pages.
3GPP TR 23.799 V1.0.1 (Sep. 2016) Technical Report; 3rd Generation Partnership Project; Technical Specification Group Services and System Aspects; Study on Architecture for Next Generation System; (Release 14); 426 pages.
BT Plc et al., "Architectural Updates for ATSSS Solution 1," SA WG2 Meeting #127, S2-184476, Sanya, P.R.China, Apr. 16-20, 2018, 17 pages.
Motorola Mobility et al., "Solution 2 Update: NW-Requested Establishment of MA-PDU session," SA WG2 Meeting #127, S2-184473, Sanya, P.R. China, Apr. 16-20, 2018, 6 pages.
Notification of Fulfilling of Registration Formality dated Jul. 18, 2023,, in connection with Chinese Patent Application No. 201980009450.8, 9 pages.
European Search Report dated Nov. 20, 2024, in connection with European Application No. 24197775.0, 11 pages.

\* cited by examiner

METHOD AND SYSTEM FOR HPLMN-BASED TRAFFIC CONTROL WHEN UE IS REGISTERED ON DIFFERENT PLMNS

CROSS-REFERENCE TO RELATED APPLICATIONS

This application is a continuation of application Ser. No. 16/963,549, which is the 371 National Stage of International Application No. PCT/KR2019/007551, filed Jun. 21, 2019, which claims priority to Indian Provisional Application No. 201841023269, filed Jun. 21, 2018, and Indian Non-Provisional Application No. 201841023269, filed Jun. 19, 2019, the disclosures of which are herein incorporated by reference in their entirety.

BACKGROUND

1. Field

The embodiments herein relate to device management. More particularly relates to a method and system for Home Public Land Mobile Network (HPLMN)-based traffic control when user equipment (UE) is registered on different PLMNs.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In general, consider that a user equipment (UE) is camped to a home network of a subscriber. Consider that the UE is registered with a HPLMN of the home network for both 3rd Generation Partnership Project (3GPP) and non-3GPP access (Consider FIG. 1, step 1). The HPLMN provides the required services to the UE based on a subscriber data policy. Current 3GPP standards support establishment of a Multi-Access protocol data unit (MA PDU) Session for Access Traffic Steering, Switching and Splitting (ATSSS) when the UE is camped on the HPLMN for both 3GPP and non-3GPP access. The ATSSS feature extends 5G system to enable traffic steering, switching and splitting between 3GPP and non-3GPP access networks. The ATSSS feature can be achieved by establishing the MA PDU session between the UE and the network. Further, when the UE is in roaming, the MA PDU session can be established only if the UE is registered to a same visitor Public Land Mobile Network (PLMN) for both the 3GPP access and the non-3GPP access. i.e., only if the UE is registered for both the 3GPP access and non-3GPP access with the same telecom operator, then that telecom operator controls how much traffic flows to 3GPP access and how much traffic should flow over non-3GPP access.

However, due to mobility when the UE is registered with different PLMNs i.e., the HPLMN for non-3GPP access and a visited Public Land Mobile Network (VPLMN) for the 3GPP access (step 4), then the MA PDU session gets terminated (step 5) or will not be able to be established. The above scenario indicates that the ATSSS feature cannot be extended when the UE is registered with two different PLMNs (i.e., two different telecom operators).

Further, due to the UE being registered with the VPLMN during roaming, majority of the traffic shall go over the VPLMN. For any traffic over the VPLMN, home operator is charged as per roaming agreements due to which the subscriber may also incurs roaming charges for the data services provided by the VPLMN. As there is no ATSSS feature support in this scenario, home operator has no control over the data traffic.

The above information is presented as background information only to help the reader to understand the present invention. Applicants have made no determination and make no assertion as to whether any of the above might be applicable as prior art with regard to the present application.

SUMMARY

The principal object of the embodiments herein is to provide a method and system for HPLMN-based traffic control in a wireless communication network when a UE is registered on different PLMNs.

Another object of the embodiments herein is to extend an ATSSS policy by the HPLMN for the UE which is registered to a VPLMN.

Another object of the embodiments herein is to increases a home operator's revenue and protect the UE from the high roaming charges reported by a visited network for services of the HPLMN.

Another object of the embodiments herein is to reduce user roaming cost.

Another object of the embodiments herein is to divert the UE traffic by the HPLMN based on the ATSSS policy.

Accordingly, the embodiments herein provide a method for HPLMN-based traffic control in a wireless communication network when a UE is registered on different PLMNs. The method includes receiving, by the HPLMN, a MA PDU session request to establish a MA PDU session from the UE which is registered for 3GPP access over a VPLMN and non-3GPP access over the HPLMN in the wireless communication network, where the MA PDU session request comprises ATSSS Capability information of the UE. Further, the method includes determining, by the HPLMN, an ATSSS policy for the MA PDU session establishment and establishing, by the HPLMN, the MA PDU session with the UE. Further, the method also includes sending, by the HPLMN, a MA PDU session establishment accept message to the UE, where the MA PDU session establishment accept message comprises the ATSSS policy.

Accordingly, the embodiments herein provide method for HPLMN-based traffic control in a wireless communication network when a UE is registered on different PLMNs. The method includes sending, by the UE, a MA PDU session request to establish a MA PDU session to the HPLMN over a first interface, where the UE is registered for 3GPP access over a VPLMN and non-3GPP access over the HPLMN in the wireless communication network and wherein the MA PDU session request comprises an ATSSS Capability information of the UE. Further, the method includes receiving, by the UE, a MA PDU session establishment accept message from the HPLMN over the first interface, wherein the MA PDU session establishment accept message comprises the ATSSS policy and sending, by the UE, the MA PDU session request to establish the MA PDU session to the HPLMN over a second interface. Further, the method also includes receiving, by the UE, the MA PDU session establishment accept message from the HPLMN over the second interface, wherein the MA PDU session establishment accept message comprises the ATSSS policy.

Accordingly, the embodiments herein provide a HPLMN for traffic control in a wireless communication network when a UE is registered on different PLMNs. The HPLMN includes a memory and a processor coupled to the memory. The processor is configured to receive a MA PDU session request to establish a MA PDU session from the UE which is registered for 3GPP access over a VPLMN and non-3GPP access over the HPLMN in the wireless communication network, wherein the MA PDU session request comprises ATSSS Capability information of the UE. The processor is also configured to determine an ATSSS policy for the MA PDU session establishment and establish the MA PDU session with the UE. Further, the processor is also configured to send a MA PDU session establishment accept message to the UE, wherein the MA PDU session establishment accept message comprises the ATSSS policy.

Accordingly, the embodiments herein provide a system for HPLMN-based traffic control in a wireless communication network when a UE is registered on different PLMNs. The system comprises the UE, the HPLMN and the VPLMN. The UE configured to send a MA PDU session request to establish a MA PDU session to the HPLMN, wherein the UE is registered for 3GPP access over the VPLMN and non-3GPP access over the HPLMN in the wireless communication network and where the MA PDU session request comprises ATSSS Capability information of the UE. The HPLMN is configured to receive the MA PDU session request to establish a MA PDU session from the UE which is registered for 3GPP access over the VPLMN and non-3GPP access over the HPLMN in the wireless communication network, where the MA PDU session request comprises the ATSSS Capability information of the UE. The HPLMN is also configured to determine an ATSSS policy for the MA PDU session establishment and establish the MA PDU session with the UE. Further, the HPLMN is configured to send a MA PDU session establishment accept message to the UE, wherein the MA PDU session establishment accept message comprises the ATSSS policy. The UE is configured to receive the MA PDU session establishment accept message from the HPLMN, wherein the MA PDU session establishment accept message comprises the ATSSS policy.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

According to aspects of the present disclosure, a method and system for HPLMN-based traffic control in a wireless communication network when a UE is registered on different PLMNs are provided.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1:
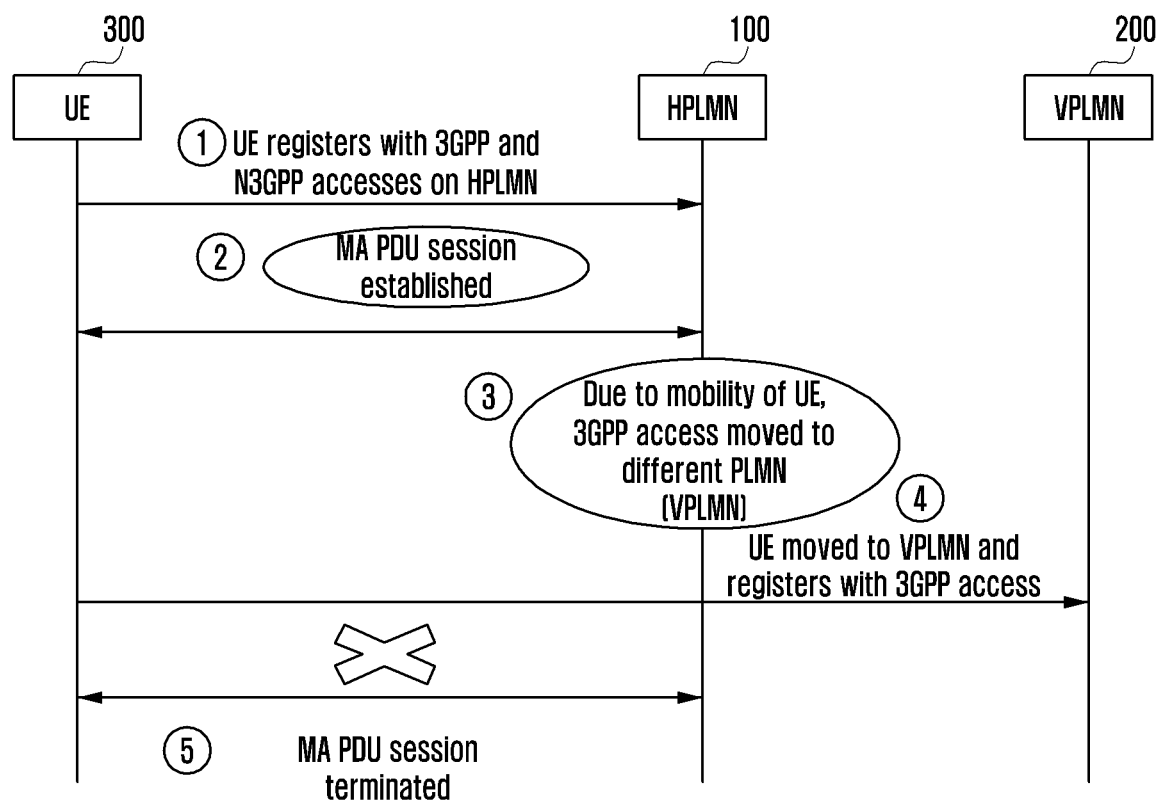
FIG. 1 is a signaling diagram illustrating a scenario when a UE is registered over a 3GPP access and a Non-3GPP access with different PLMNs, according to prior art.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provide a method for HPLMN-based traffic control in a wireless communication network when a UE is registered on different PLMNs. The method includes receiving, by the HPLMN, a MA PDU session request to establish a MA PDU session from the UE which is registered for 3GPP access over a VPLMN and non-3GPP access over the HPLMN in the wireless communication network, where the MA PDU session request comprises ATSSS Capability information of the UE. Further, the method includes determining, by the HPLMN, an ATSSS policy for the MA PDU session establishment and establishing, by the HPLMN, the MA PDU session with the UE. Further, the method also includes sending, by the HPLMN, a MA PDU session establishment accept message to the UE, where the MA PDU session establishment accept message comprises the ATSSS policy.

In an embodiment, the establishing, by the HPLMN, the MA PDU session with the UE includes receiving the MA PDU session establishment request from the UE to an H-SMF of the HPLMN over a first interface. The method also includes determining whether establishment of the MA PDU session is allowed by the H-SMF of the HPLMN based on a home operator policy (for example by contacting policy control function (PCF) and a subscription data (for example by contacting the Unified data management (UDM)) or based on local configuration. Further, the method includes establishing a MA PDU session context with the H-UPF of the HPLMN by the H-SMF of the HPLMN, where the H-SMF of the HPLMN provides a N4 filter rules to the H-UPF. Further, the method also includes establishing the MA PDU session with the UE in response to determining that establishment of the MA PDU session is allowed and receiving a MA PDU session establishment request to the H-SMF over the second interface. Furthermore, the method includes determining whether establishment of the MA PDU session is allowed by the H-SMF of the HPLMN based on the home operator policy and the subscription data. Finally, the method includes establishing the MA PDU session context with the H-UPF of the HPLMN by the H-SMF of the HPLMN, wherein the H-SMF of the HPLMN provides a N4 filter rules to the H-UPF and establishing the MA PDU session with the UE in response to determining that establishment of the MA PDU session is allowed.

In an embodiment, the first interface is a N11 interface and the second interface is a N16 interface.

In an embodiment, the first interface is a N16 interface and the second interface is a N11 interface.

In an embodiment, the N11 interface is established between an H-AMF of the HPLMN and the H-SMF of the HPLMN indicating that the MA PDU session establishment request is received from the UE which is registered over a non-3GPP access on the HPLMN. In this case, the receiving of MA PDU session establishment request from the UE to an H-SMF of the HPLMN includes the UE sending MA PDU session establishment request message to HPLMN AMF, HPLMN AMF requests HPLMN SMF to create the PDU session context. The method of establishing the MA PDU session with the UE by the H-SMF includes H-SMF provides the Namf_Communication_N1N2_message_transfer to the AMF. Then AMF forwards the PDU session establishment accept message to the UE. The PDU session establishment accept message indicates the success of establishing MA PDU session to the UE. This message includes the ATSSS rules for the MA PDU session, which were derived by H-SMF, and may include Measurement Assistance Information.

In an embodiment, the N16 interface is established between a V-SMF of the VPLMN and the H-SMF of the HPLMN indicating that the MA PDU session establishment request is received from the UE which is registered over a 3GPP access on the VPLMN. In this case, the receiving of MA PDU session establishment request from the UE to an H-SMF of the HPLMN includes the UE sending MA PDU session establishment request message to VPLMN AMF, VPLMN AMF requests VPLMN SMF to create the PDU session context, VPLMN SMF requests the HPLMN SMF (H-SMF) to create the PDU session context. The method of establishing the MA PDU session with the UE includes H-SMF provides Nsmf_PDUSession_Create response message to the V-SMF. V-SMF provides the Namf_Communication_N1N2_message_transfer to the AMF. Then AMF forwards the PDU session establishment accept message to the UE. The PDU session establishment accept message indicates the success of establishing MA PDU session to the UE. This message includes the ATSSS rules for the MA PDU session, which were derived by H-SMF, and may include Measurement Assistance Information.

In an embodiment, the H-SMF is an anchor point for ATSSS related decisions for the MA PDU session of the UE between the H-SMF and the V-SMF.

In an embodiment, the H-UPF is the anchor point between the H-UPF and a V-UPF and provides ATSSS related performance decision information to the UE.

The PMF of UE side or/and H-UPF side should be able to correlate the measurement packets with the corresponding access type in order to get the accurate measurement result for each access. The PMF of UE side correlates the sent measurement request and received measurement response messages via the same access type, and the PMF of H-UPF side correlates the sent measurement request and received measurement response messages via the same N3 or N9 Tunnel. The PMF of H-UPF side shall record the relationship between the RTT measurement result and the N3 or N9 Tunnel. That is the H-UPF is the anchor for ATSSS related functionality between the V-UPF and H-UPF.

Referring now to the drawings, and more particularly to FIGS. 2 through 9, where similar reference characters denote corresponding features consistently throughout the figures, there are shown preferred embodiments.

Figure 2:
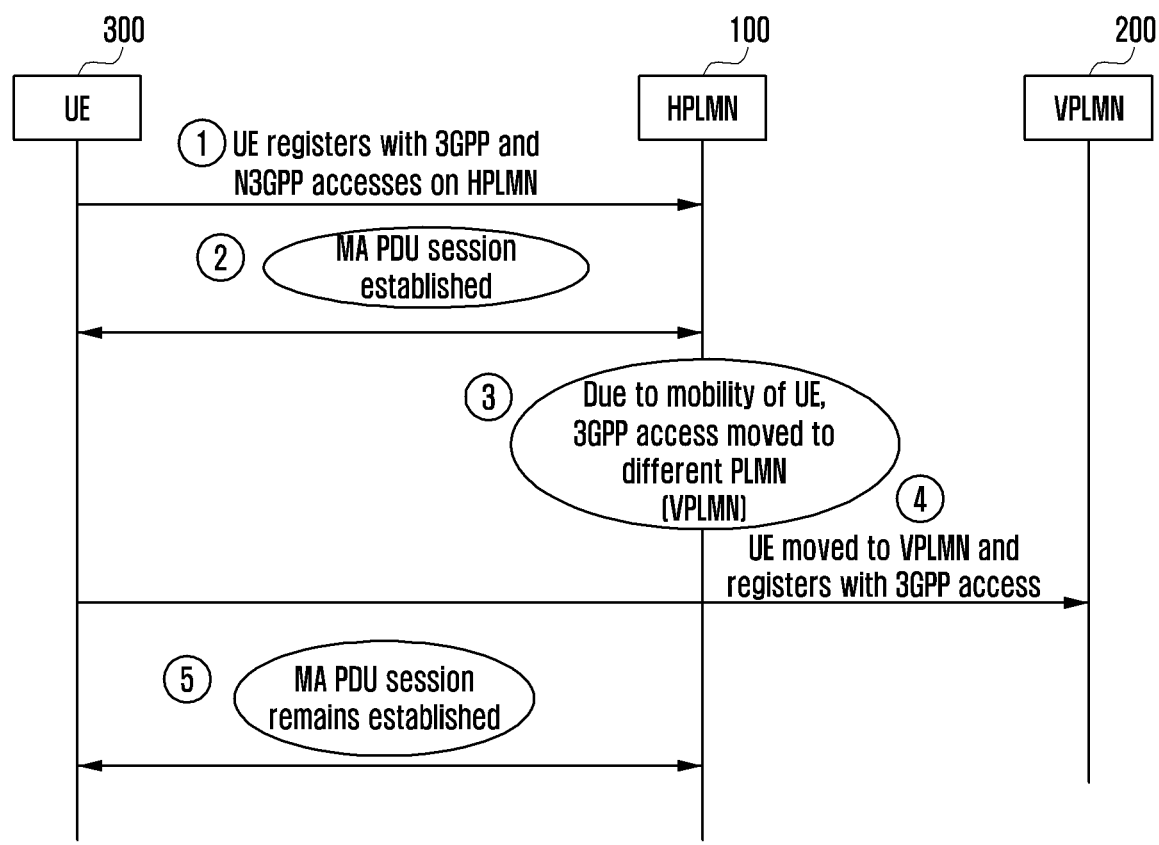
FIG. 2 is a signaling diagram illustrating extension of a MA PDU session to the UE which is registered on different PLMNs, according to an embodiment as disclosed herein.

FIG. 2 is a signaling diagram illustrating extension of the MA PDU session to the UE 300 which is registered on different PLMNs, according to an embodiment as disclosed herein.

Referring to the FIG. 2, at step 1 the UE 300 is registered with the HPLMN 100 of the home network for both 3GPP and non-3GPP access. The HPLMN 100 provides the required services to the UE 300 based on a subscriber data policy. In the proposed method, at step 2, the MA PDU Session for ATSSS is established when the UE 300 is camped on the same HPLMN 100 for both 3GPP and non-3GPP access.

At step 3 and step 4, as the UE 300 is in roaming, due to mobility the UE 300 is moved to different PLMN (i.e., visited PLMN 200) for the 3GPP access. At step 5, according to the proposed method, the MA PDU session is established by extending the ATSSS feature to the UE 300 by the HPLMN 100 where the UE 300 is registered with the HPLMN 100 for non-3GPP access and the VPLMN 200 for the 3GPP access.

The proposed method ensures that the subscriber is not burdened with the roaming charges. Further, the proposed method allows the home operator to control the data traffic of the UE 300.

Figure 3:
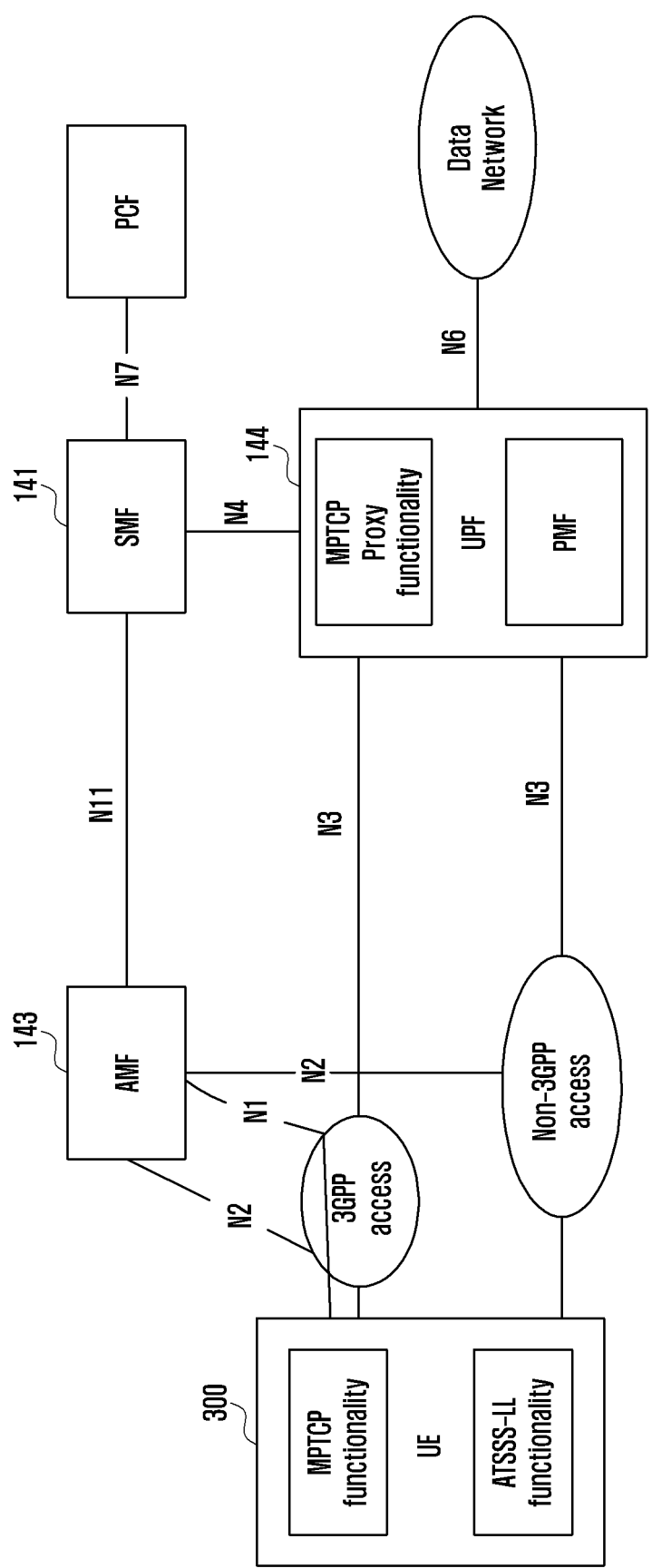
FIG. 3 is a schematic diagram, illustrating the UE which is in non-roaming with local breakout architecture for ATSSS support, according to prior art.

FIG. 3 is a schematic diagram, illustrating the UE 300 which is in non-roaming with local breakout architecture for the ATSSS support, according to prior art.

Currently TR agreement of 23.793 describes support of the MA PDU Session for the ATSSS when the UE 300 is camped on the same PLMN (i.e., same HPLMN 100/VPLMN 200) in both the 3GPP access and the N3GPP access in both home and roaming scenarios. The ATSSS policy is introduced to enhance the usage of existing network resources by diverting traffic using steering, switching, splitting of the data traffic. The ATSSS policy can be either pre-configured or provisioned during the establishment of the MA PDU session or modified dynamically based on the different factors like throughput, latency, signal conditions etc.

Referring to the FIG. 3, consider that the UE 300 is in non-roaming and is registered with the HPLMN 100 for both the 3GPP access and the non-3GPP access. In the conventional methods and systems, the ATSSS feature is supported to the UE 300 when the UE 300 registered to 3GPP access, N3GPP access over the same HPLMN 100 (as shown in FIG. 3). The N11 interface is established between the H-AMF 143 of the HPLMN 100 and the H-SMF 141 of the HPLMN 100 indicating that the MA PDU session establishment request is received from the UE 300 which is registered over the non-3GPP access on the HPLMN 100.

In the conventional methods and systems, the ATSSS feature is supported to the UE 300 when the UE 300 registered to 3GPP access, N3GPP access over the same VPLMN 200 in LBO (Local Break Out). However, when the UE 300 is in roaming and is registered with different PLMNs for the 3GPP access and the non-3GPP access, then the conventional method terminates the MA PDU session.

Figure 4:
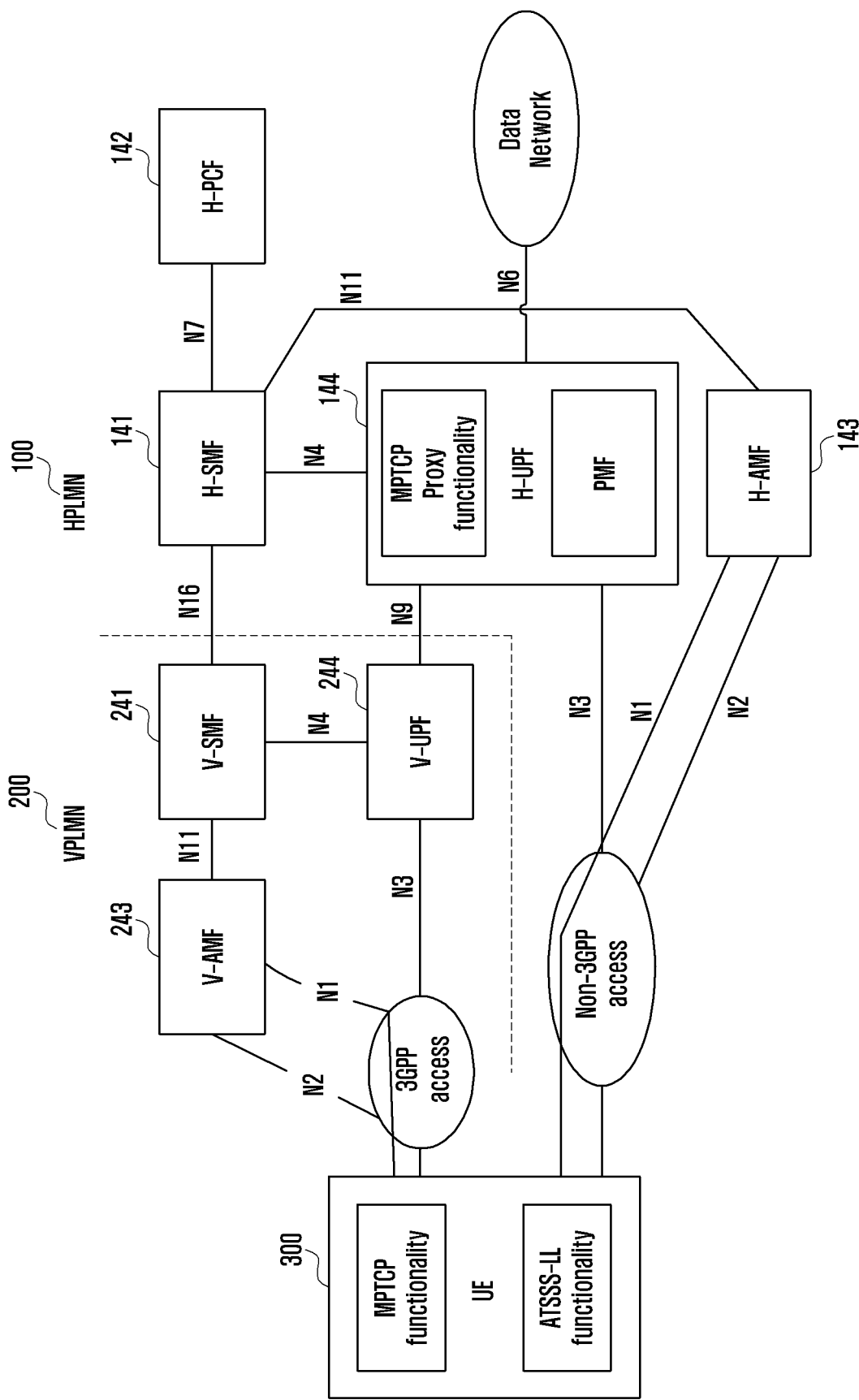
FIG. 4 is architecture for providing an extension of the MA PDU session to the UE which is registered on different PLMNs, according to an embodiment as disclosed herein.

FIG. 4 is architecture for providing an extension of the MA PDU session to the UE 300 which is registered on different PLMNs, according to an embodiment as disclosed herein.

Referring to the FIG. 4, in conjunction with FIG. 3, consider that the UE 300 is in roaming. When the UE 300 enters a visited network and has no entry in the VLR 245 (refer FIG. 6) of the network, the required subscriber data is first requested by the VPLMN 200 from the subscriber's home network (i.e., from the HPLMN 100) to perform the authentication of the subscriber and for authorization for using the network services. The VLR 245 then enters the visiting subscriber's acquired information and the authorized network services are enabled.

The UE 300 is registered to the VPLMN 200 via Home Routed (HR) VPLMN 200 over the 3GPP access and to the N3GPP access via HPLMN 100. When UE 300 requests for the MA PDU session establishment, a H-SMF 141 shall indicate to both VSMF 241 and the UE 300 that the UE 300 is allowed to establish the MA PDU session. The UE 300 then proceeds with the MA PDU session establishment procedure for the requested PDU (if required) and thereby extending the ATSSS feature support in the Home Routed roaming case. The N16 interface established between the V-SMF 241 of the VPLMN 200 and the H-SMF 141 of the HPLMN 100 indicates that the MA PDU session establishment request is received from the UE 300 which is registered over the 3GPP access on the VPLMN 200. Further, the N11 interface is established between the H-AMF 143 of the HPLMN 100 and the H-SMF 141 of the HPLMN 100. In this case, the MA PDU session establishment request is received from the UE 300 which is registered over the non-3GPP access on the HPLMN 100.

During the procedure, the H-SMF 141 shall send a "Least cost Access for Roaming" ATSSS policy to the UE 300 so that the HPLMN 100 can control the traffic flow of the subscriber. The "Least cost access for roaming" policy provides the configuration to divert (Switch/Split/Steer) the data traffic towards access registered to HPLMN 100, thereby increasing home operator revenue even in the roaming scenario. In the above scenario, the H-SMF 141 is the anchor point for the ATSSS related decisions for the MA PDU session of the UE 300 between the H-SMF 141 and the V-SMF 241.

Also, the H-UPF 144 is the anchor point between the H-UPF 144 and the V-UPF 244 to provide the ATSSS related performance decision information to the UE 300.

Figure 5:
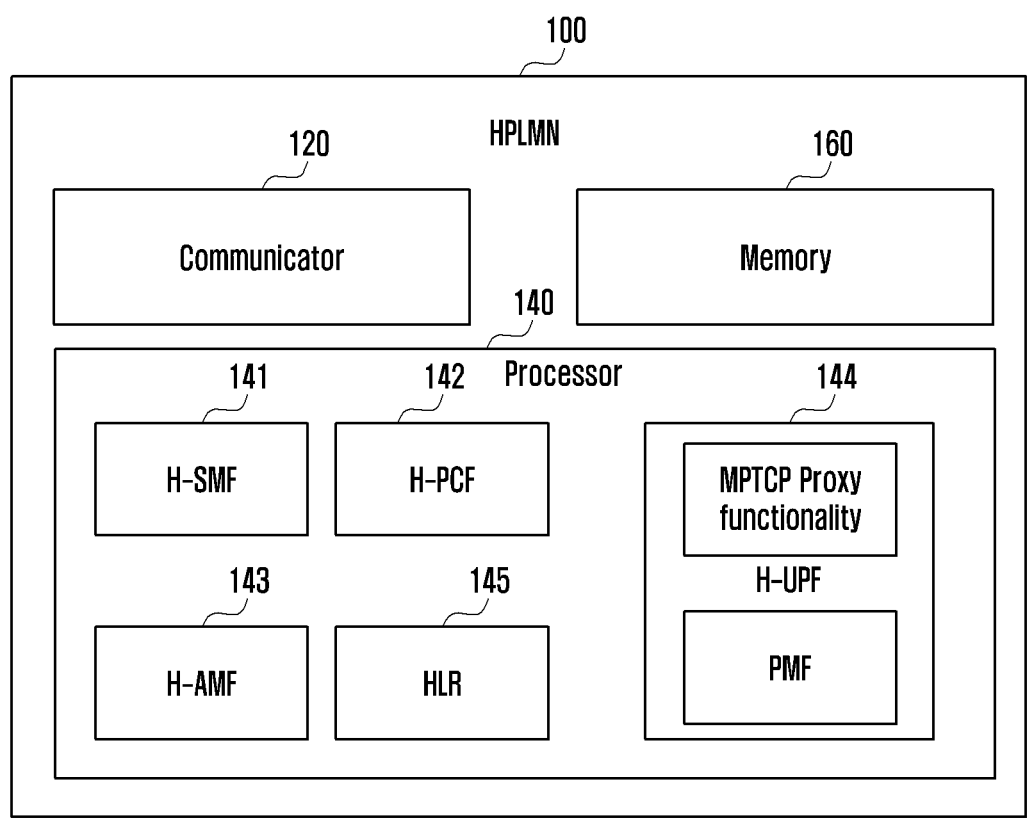
FIG. 5 is a block diagram of a HPLMN for traffic control in a wireless communication network when the UE is registered on different PLMNs, according to an embodiment as disclosed herein.

FIG. 5 is a block diagram of the HPLMN 100 for traffic control in the wireless communication network when the UE 300 is registered on different PLMNs, according to an embodiment as disclosed herein.

The Home Public Land Mobile Network (HPLMN) 100 identifies the PLMN (Public Land Mobile Network) in which the subscribers profile is held. The HLR 145 holds the subscribers profile with data including subscription data for the specific subscribers. The users roaming to other networks will receive subscription information from the HPLMN 100. The HPLMN 100 may transfer the subscription data to a VLR 245 of the VPLMN 200 (during registration in a PLMN). The HPLMN 100 may also contain various service nodes, such as a short message service center (SMSC), service control point (SCP), etc.

Referring to the FIG. 5, the HPLMN 100 includes a communicator 120, a processor 140 and a memory 160. The processor 140 includes a home session management function (H-SMF) 141, a home Policy Control function (H-PCF) 142, a home access and mobility management function (H-AMF) 143, a home User Plane Function (H-UPF) 144 and a Home Location Register (HLR) 145.

In an embodiment, the communicator 120 is configured to receive the MA PDU session request from the UE 300. Initially the MA PDU session request from the UE 300 is received over the first interface and after establishment of the MA PDU session over the first interface, the MA PDU session request is again received from the UE 300 over the second interface to establish of the MA PDU session over the second interface. The UE 300 is registered for 3GPP access over the VPLMN and non-3GPP access over the HPLMN 100 in the wireless communication network. The MA PDU session request includes the ATSSS Capability information of the UE 300. Further, the communicator 120 forwards the MA PDU session establishment request to the H-SMF 141.

In an embodiment, the H-PCF 142 is configured to send a PCC policy to the H-SMF 141 including the ATSSS policy. Further, as the extension of the ATSSS policy, the PCC policy may include new parameters to PCC rule such as for example Access Technology, Routing Factor (optional), Second Access Technology (optional) and Routing Factor (optional). The H-SMF 141 is configured to determine whether the MA PDU session can be establishment based on the home operator policy and the subscription data. In response to determining that the establishment of the MA PDU session is allowed based on the home operator policy and the subscription data, the H-SMF 141 establishes the MA PDU session context with the H-UPF 144. The H-SMF 141 is also configured to provide a N4 interface filter rules to the H-UPF 1441. Further, the H-SMF 141 generates the MA PDU session establishment accept message. The communicator 120 is configured to send the MA PDU session establishment accept message to the UE 300. The MA PDU session establishment accept message includes the ATSSS policy.

Further, the communicator 120 is configured to send the MA PDU session establishment accept message to the UE 300. The MA PDU session establishment accept message comprises the ATSSS policy.

In one of the embodiments, the first interface is a N11 interface and the second interface is a N16 interface.

In another embodiment, the first interface is a N16 interface and the second interface is a N11 interface.

The N11 interface is established between the H-AMF 143 of the HPLMN 100 and the H-SMF 141 of the HPLMN 100 indicating that the MA PDU session establishment request is received from the UE 300 which is registered over the non-3GPP access on the HPLMN 100. The N16 interface is established between the V-SMF 241 of the VPLMN 200 and the H-SMF 141 of the HPLMN 100 indicating that the MA PDU session establishment request is received from the UE 300 which is registered over the 3GPP access on the VPLMN 200. Therefore, the H-SMF 141 is an anchor point for the ATSSS related decisions for the MA PDU session of the UE 300 between the H-SMF 141 and the V-SMF 241. Further, the H-UPF 144 is the anchor point between the H-UPF 144 and a V-UPF 244 and provides ATSSS related performance decision information to the UE 300.

In an embodiment, the memory 160 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 160 may, in some examples, be considered a non-transitory storage medium. The term "non-transitory" may indicate that the storage medium is not embodied in a carrier wave or a propagated signal. However, the term "non-transitory" should not be interpreted that the memory 160 is non-movable. In some examples, the memory 160 can be configured to store larger amounts of information than the memory. In certain examples, a non-transitory storage medium may store data that can, over time, change (e.g., in Random Access Memory (RAM) or cache).

Although the FIG. 5 shows the hardware elements of the HPLMN 100 but it is to be understood that other embodiments are not limited thereon. In other embodiments, the HPLMN device 100 may include less or more number of elements. Further, the labels or names of the elements are used only for illustrative purpose and does not limit the scope of the invention. One or more components can be combined together to perform same or substantially similar function for enabling interaction on HPLMN 100.

Figure 6:
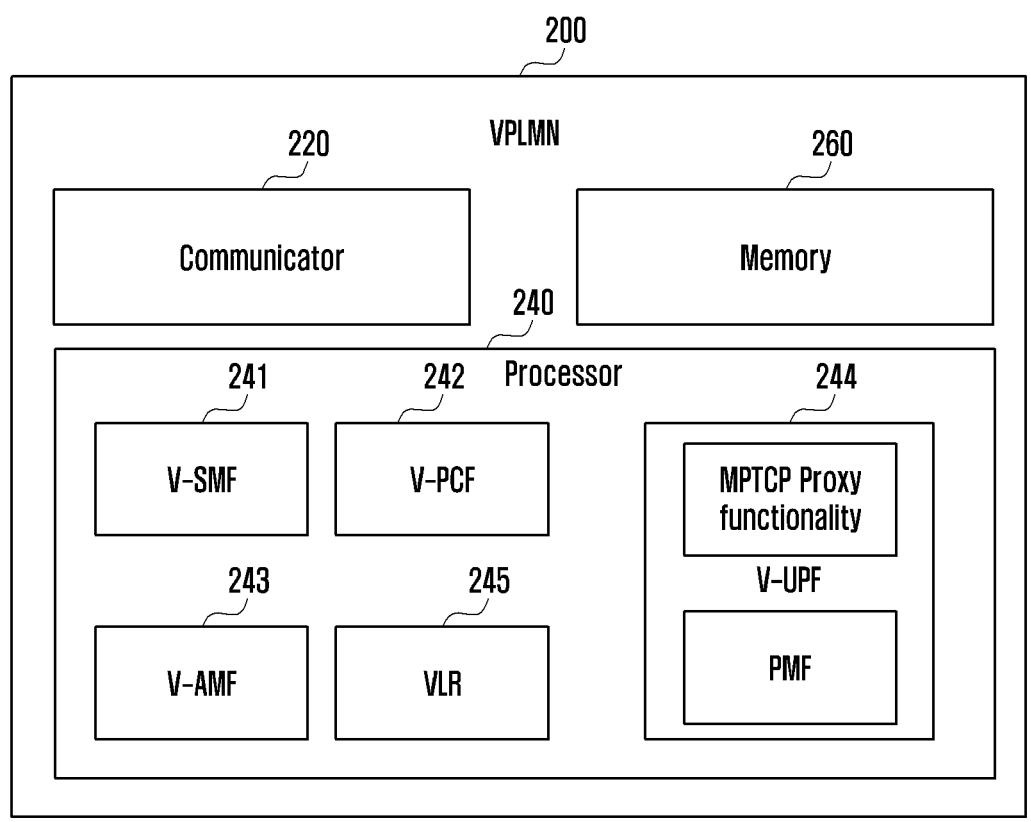
FIG. 6 is a block diagram of a VPLMN in the wireless communication network to which the UE is registered, according to an embodiment as disclosed herein.

FIG. 6 is a block diagram of the VPLMN 200 in the wireless communication network to which the UE 300 is registered, according to an embodiment as disclosed herein.

The Visited PLMN (VPLMN) 200 is the network where a subscriber is currently registered after moving away from the home network. The subscriber is registered in the HPLMN 100 and hence the subscriber is outbound roaming (from HPLMN 100's perspective) and inbounds roaming (from VPLMN 200's perspective). When the subscriber is currently registered in the HPLMN 100, then the HPLMN 100 is same as the VPLMN 200. Therefore, the HPLMN 100 for one subscriber is the VPLMN 200 for the other subscriber.

When the UE 300 enters a visited network and has no entry in the HLR 145 of the network, the required subscriber data must first be requested by the VPLMN 200 from the subscriber's home network (i.e., from the HPLMN 100) in order to authenticate the subscriber and for authorization for using the network services. The "visiting" subscriber acquires an entry in the VLR 245 and the authorized network services are enabled. If there is no roaming agreement between the two networks, i.e., the HPLMN 100 and the VPLMN 200 then the continuance of service becomes impossible, and service is denied by the visited network. The roaming subscriber is connected to the E-UTRAN, MME and S-GW of the visited network. However, by using a home network's PDN-GW, the user can have access to the home operator's services even while in the visited network.

The VPLMN 200 includes a communicator 220, a processor 240 and a memory 260. The processor 240 includes a visitor session management function (V-SMF) 241, a visitor Policy Control function (V-PCF) 242, a visitor access and mobility management function (V-AMF) 243, a visitor User Plane Function (V-UPF) 244 and a visitor location register (VLR) 245.

The UE 300 is registered for 3GPP access over the VPLMN 200. In conjunction with the FIG. 3, the N16 interface is established between the V-SMF 241 of the VPLMN 200 and the H-SMF 141 of the HPLMN 100 to extend the ATSSS policy of the HPLMN 100 to the UE 300 even when the UE 300 is registered to the VPLMN 200 due to roaming. Therefore, the UE 300 receives the MA PDU session support even when the UE 300 is on the VPLMN 200 3GPP and N3GPP access with home routed support. The proposed method helps in enhancing the home operator's revenue and also avoids high roaming charges to the subscriber reported by VPLMN 200 for the services.

Figure 7:
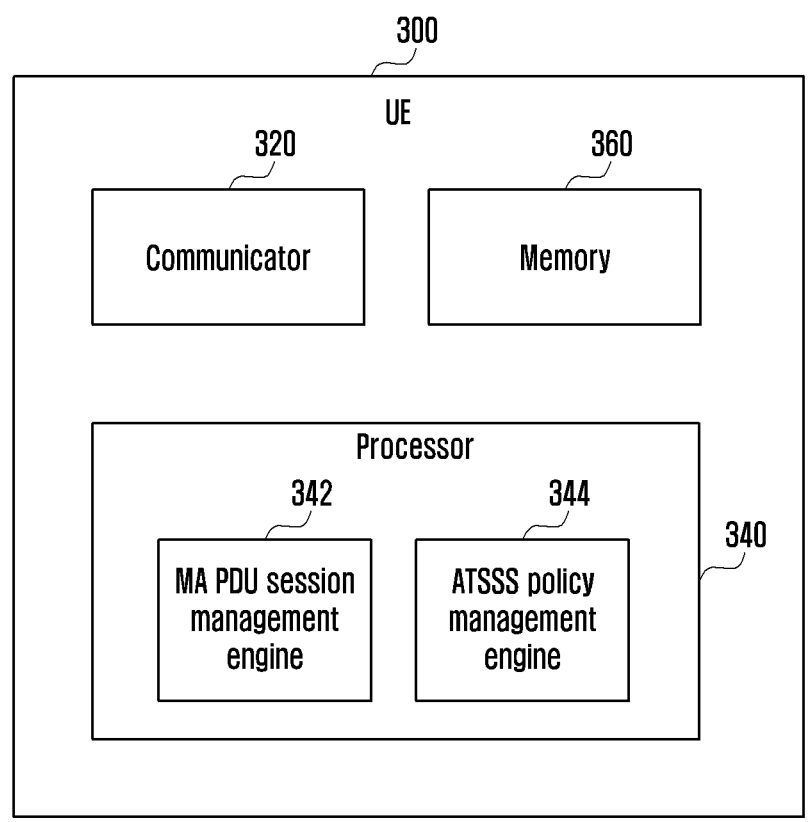
FIG. 7 is a block diagram of the UE which is registered on different PLMNs in the wireless communication network, according to an embodiment as disclosed herein.

FIG. 7 is a block diagram of the UE 300 which is registered on different PLMNs in the wireless communication network, according to an embodiment as disclosed herein.

Referring to the FIG. 7, the UE 300 may be fixed or mobile and may also be called by another term, such as a Mobile Station (MS), a User Terminal (UT), a Subscriber Station (SS), a wireless device, a Personal Digital Assistant (PDA), a wireless modem, a handheld device, or an Access Terminal (AT).

The UE 300 includes a communicator 320, a processor 340 and a memory 360. The processor 340 includes a MA PDU session management engine 342 and an ATSSS policy management engine 344.

In an embodiment, the UE 300 is registered for 3GPP access over the VPLMN 200 and non-3GPP access over the HPLMN 100 in the wireless communication network.

The MA PDU session management engine 342 is configured to indicate to the communicator 320, when the MA PDU session request needs to be sent to the HPLMN 100. The MA PDU session request comprises the ATSSS Capability information of the UE 300. The ATSSS policy management engine 344 provides the ATSSS capability information to the MA PDU session management engine 342. The MA PDU session management engine 342 appends the ATSSS capability information to the MA PDU session request which is sent to the HPLMN 100. The communicator 320 is configured to send the MA PDU session request to the HPLMN 100, requesting the HPLMN 100 to establish the MA PDU session over the first interface.

The ATSSS capability may be discovered during initial MA PDU Session Establishment and the inter-PLMN mobility procedures where the network functions indicate the ATSSS support. If one of these network functions indicates no support for the ATSSS capability, corresponding MA PDU session will not have the ATSSS support. The communicator 320 is also configured to receive the MA PDU session establishment accept message from the HPLMN 100 over the first interface. The MA PDU session establishment accept message comprises the ATSSS policy. The ATSSS policy management engine 344 is further configured to receive the ATSSS policy. The ATSSS Policy defines the certain policies according to the application-specific information, the UE subscription data, user preference, local policy or any combination of them. The policies defined by the ATSSS Policy include Traffic steering policy, Traffic switching policy, Traffic splitting policy etc.

Further, the communicator 320 is also configured to send the MA PDU session request to establish the MA PDU session to the HPLMN 300 over the second interface and in response receive the MA PDU session establishment accept message from the HPLMN 300 over the second interface.

In an embodiment, the memory 360 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 360 may, in some examples, be considered a non-transitory storage medium. The term "non-transitory" may indicate that the storage medium is not embodied in a carrier wave or a propagated signal. However, the term "non-transitory" should not be interpreted that the memory 360 is non-movable. In some examples, the memory 360 can be configured to store larger amounts of information than the memory. In certain examples, a non-transitory storage medium may store data that can, over time, change (e.g., in Random Access Memory (RAM) or cache).

Although the FIG. 7 shows the hardware elements of the UE 300 but it is to be understood that other embodiments are not limited thereon. In other embodiments, the UE 300 may include less or more number of elements. Further, the labels or names of the elements are used only for illustrative purpose and does not limit the scope of the invention. One or more components can be combined together to perform same or substantially similar function.

Figure 8A:
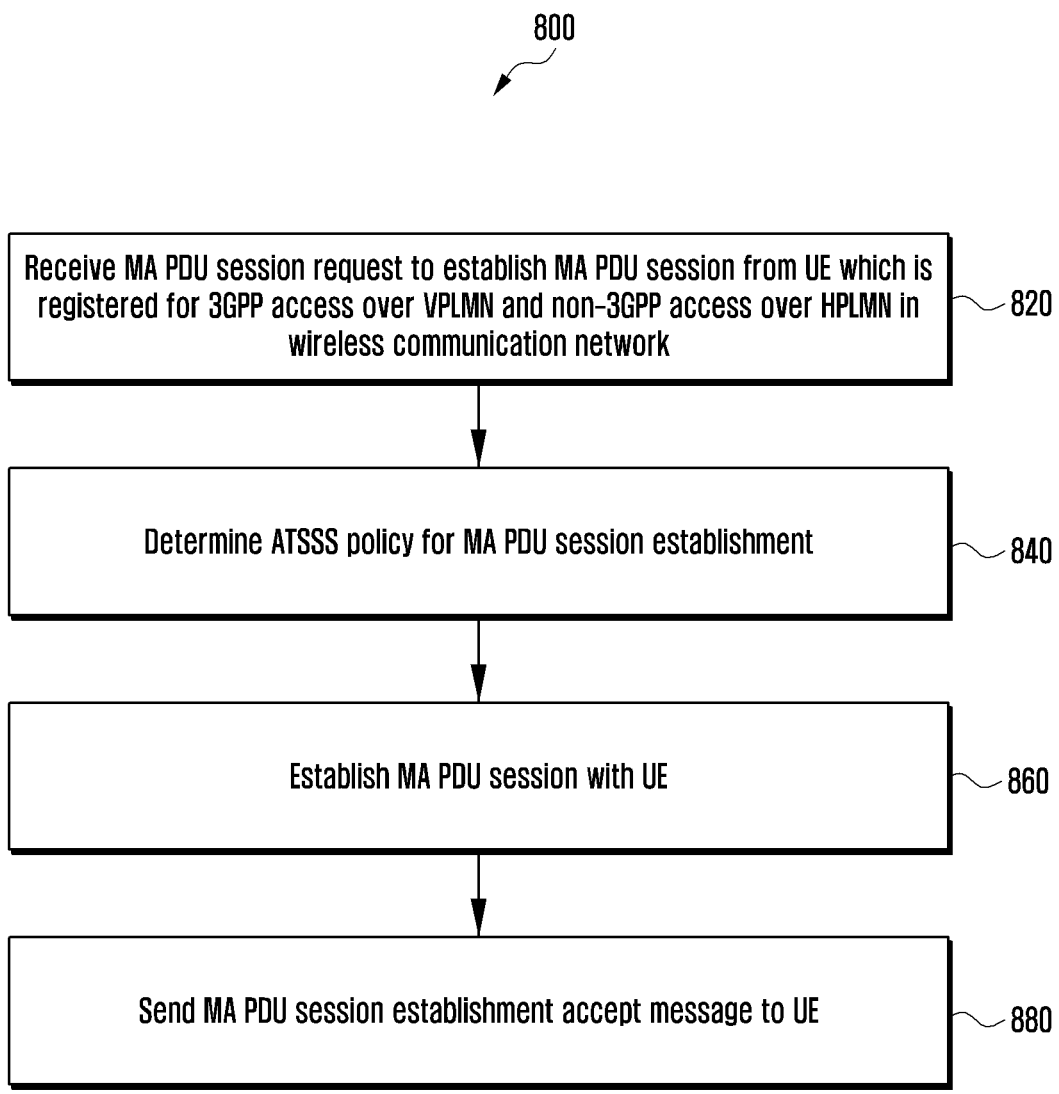
FIG. 8A is a flowchart for a method for the HPLMN-based traffic control in the wireless communication network when the UE is registered on different PLMNs, according to an embodiment as disclosed herein.

FIG. 8A is a flowchart 800 for a method for the HPLMN-based traffic control in the wireless communication network when the UE 300 is registered on different PLMNs, according to an embodiment as disclosed herein.

Referring to the FIG. 8A, at step 820, the HPLMN 100 receives the MA PDU session request to establish the MA PDU session from the UE 300 which is registered for 3GPP access over the VPLMN 200 and non-3GPP access over the HPLMN 100 in the wireless communication network. For example, in the HPLMN 100 as illustrated in the FIG. 5, the communicator 140 can be configured to receive the MA PDU session request to establish the MA PDU session from the UE 300 which is registered for 3GPP access over the VPLMN 200 and non-3GPP access over the HPLMN 100 in the wireless communication network.

At step 840, the HPLMN 100 determines the ATSSS policy for the MA PDU session establishment. For example, in the HPLMN 100 as illustrated in the FIG. 5, the H-SMF 141 can be configured to determine the ATSSS policy for the MA PDU session establishment.

At step 860, the HPLMN 100 establishes the MA PDU session with the UE 300. For example, in the HPLMN 100 as illustrated in the FIG. 5, the H-SMF 141 can be configured to establish the MA PDU session with the UE 300.

At step 880, the HPLMN 100 sends the MA PDU session establishment accept message to the UE 300. For example, in the HPLMN 100 as illustrated in the FIG. 5, the H-SMF 141 can be configured to send the MA PDU session establishment accept message to the UE 300.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 8B:
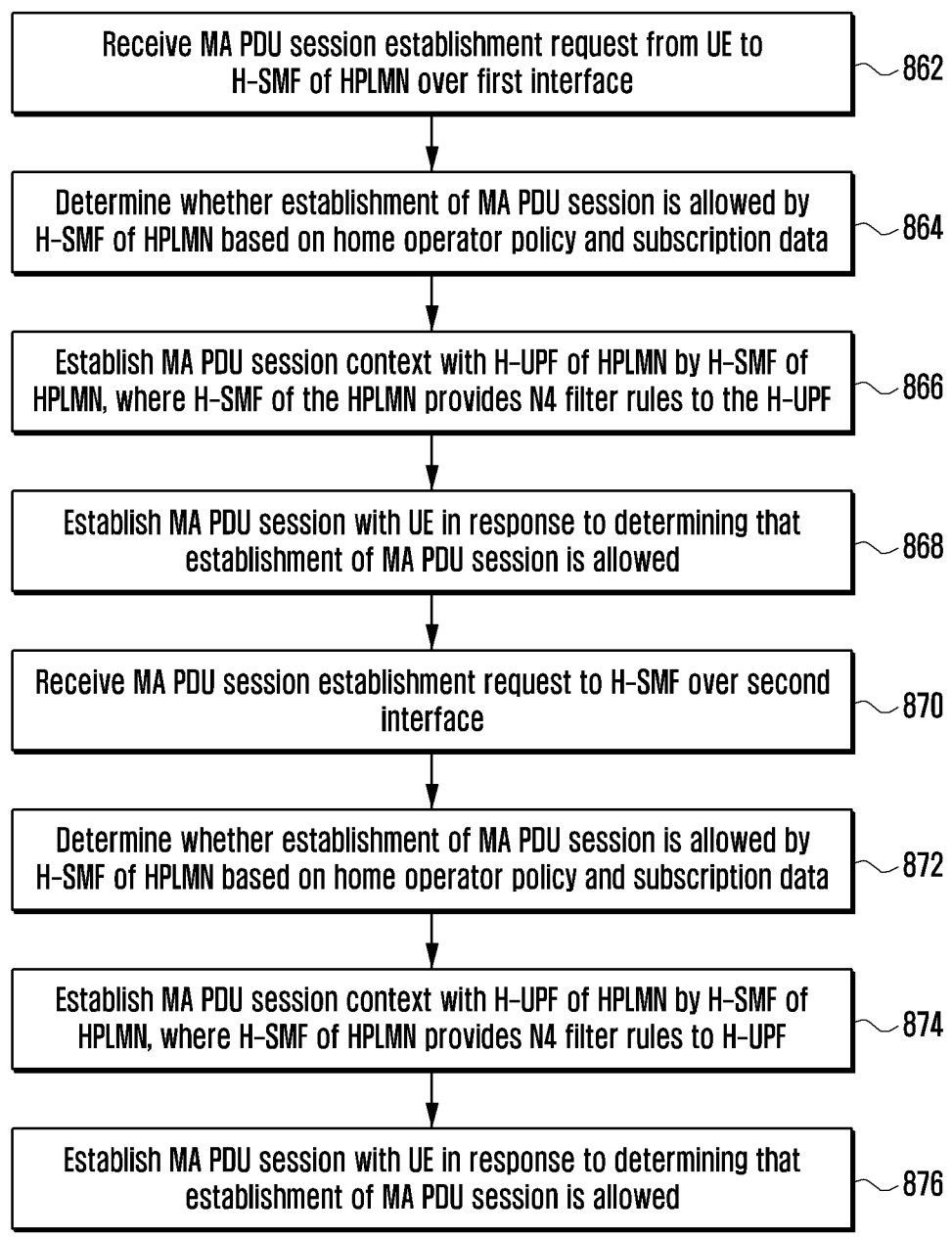
FIG. 8B is a flowchart for a method for establishing the MA PDU session with the UE, according to an embodiment as disclosed herein.

FIG. 8B is a flowchart for a method for establishing the MA PDU session with the UE 300, according to an embodiment as disclosed herein.

Referring to the FIG. 8B, at step 862, the HPLMN 100 receives the MA PDU session establishment request from the UE 300 to the H-SMF 141 over the first interface. For example, in the HPLMN 100 as illustrated in the FIG. 5, the processor 140 can be configured to receive the MA PDU session establishment request from the UE 300 to the H-SMF 141 over the first interface.

At step 864, the HPLMN 100 determines whether establishment of the MA PDU session is allowed by the H-SMF 141 of the HPLMN 100 based on the home operator policy and the subscription data. For example, in the HPLMN 100 as illustrated in the FIG. 5, the processor 140 can be configured to determine whether establishment of the MA PDU session is allowed by the H-SMF 141 of the HPLMN 100 based on the home operator policy and the subscription data.

At step 866, the HPLMN 100 establishes the MA PDU session context with the H-UPF 144 of the HPLMN 100 by the H-SMF 141 of the HPLMN 100, where the H-SMF 141 of the HPLMN 100 provides the N4 filter rules to the H-UPF 144. For example, in the HPLMN 100 as illustrated in the FIG. 5, the processor 140 can be configured to establish the MA PDU session context with the H-UPF 144 of the HPLMN 100 by the H-SMF 141 of the HPLMN 100, where the H-SMF 141 of the HPLMN 100 provides the N4 filter rules to the H-UPF 144.

At step 868, the HPLMN 100 establishes the MA PDU session with the UE 300 in response to determining that establishment of the MA PDU session is allowed. For example, in the HPLMN 100 as illustrated in the FIG. 3, the processor 140 can be configured to establish the MA PDU session with the UE 300 in response to determining that establishment of the MA PDU session is allowed.

At step 870, the HPLMN 100 receives the MA PDU session establishment request to the H-SMF 141. For example, in the HPLMN 100 as illustrated in the FIG. 5, the communicator 120 can be configured to receive the MA PDU session establishment request to the H-SMF 141.

At step 872, the HPLMN 100 determines whether establishment of the MA PDU session is allowed by the H-SMF 141 of the HPLMN 100 based on the home operator policy and the subscription data. For example, in the HPLMN 100 as illustrated in the FIG. 5, the processor 140 can be configured to determine whether establishment of the MA PDU session is allowed by the H-SMF 141 of the HPLMN 100 based on the home operator policy and the subscription data.

At step 874, the HPLMN 100 establishes the MA PDU session context with the H-UPF 144 of the HPLMN 100 by the H-SMF 141 of the HPLMN 100. For example, in the HPLMN 100 as illustrated in the FIG. 5, the processor 140 can be configured to establish the MA PDU session context with the H-UPF 144 of the HPLMN 100 by the H-SMF 141 of the HPLMN 100.

At step 876, the HPLMN 100 establishes the MA PDU session with the UE 300 in response to determining that establishment of the MA PDU session is allowed. For example, in the HPLMN 100 as illustrated in the FIG. 5, the processor 140 can be configured to establish the MA PDU session with the UE 300 in response to determining that establishment of the MA PDU session is allowed.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 9:
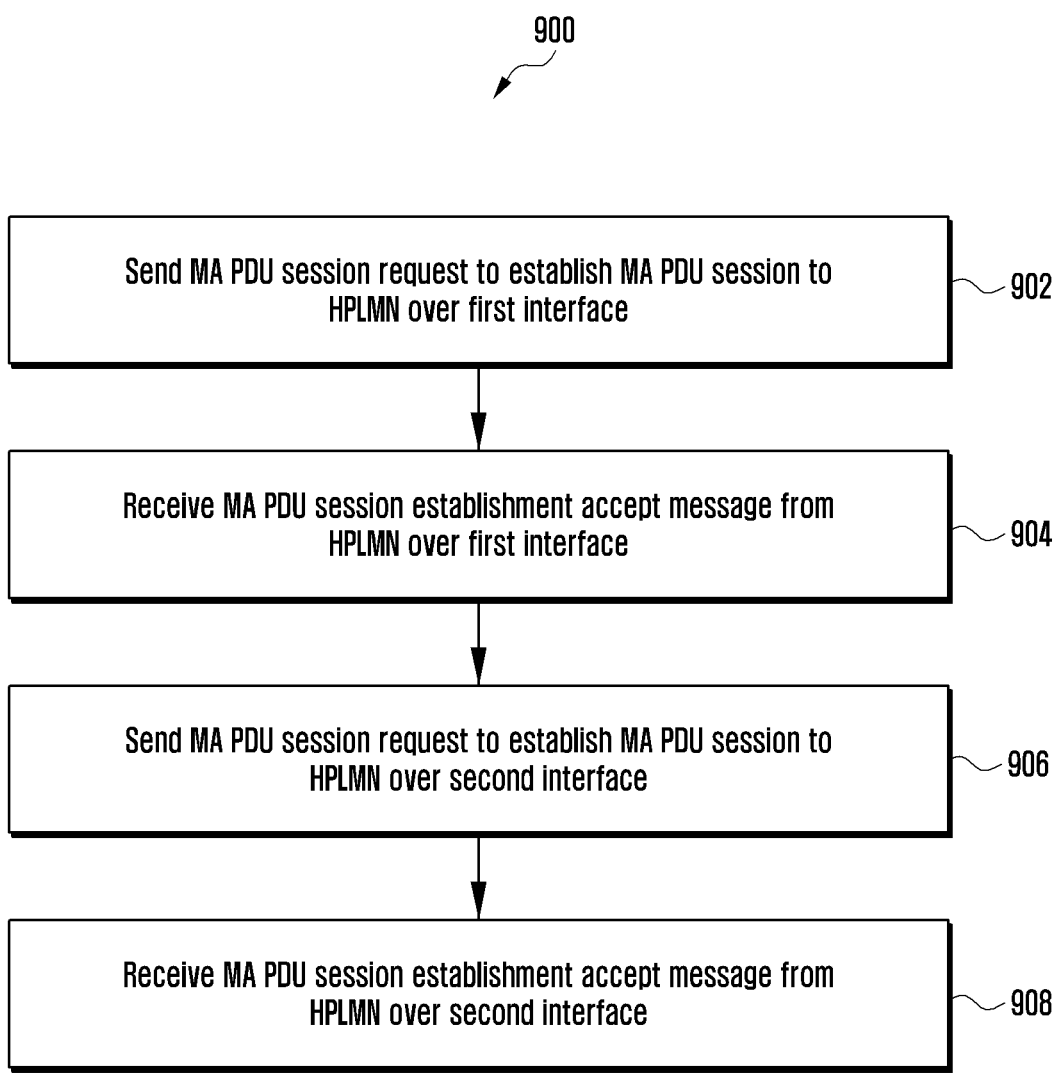
FIG. 9 is a flowchart for a method for establishing the MA PDU session with the UE with the different PLMNs, according to an embodiment as disclosed herein.

FIG. 9 is a flowchart for a method for establishing the MA PDU session with the UE 300 with the different PLMNs, according to an embodiment as disclosed herein.

Referring to the FIG. 9, at step 902, the UE 300 sends the MA PDU session request to establish the MA PDU session to the HPLMN 100 over the first interface. For example, in the UE 300 as illustrated in the FIG. 7, the communicator 320 can be configured to send the MA PDU session request to establish the MA PDU session to the HPLMN 100 over the first interface.

At step 904, the UE 300 receives the MA PDU session establishment accept message from the HPLMN 100 over the first interface. For example, in the UE 300 as illustrated in the FIG. 7, the communicator 320 can be configured to receive the MA PDU session establishment accept message from the HPLMN 100 over the first interface.

At step 906, the UE 300 sends the MA PDU session request to establish the MA PDU session to the HPLMN 100 over the second interface. For example, in the UE 300 as illustrated in the FIG. 7, the communicator 320 can be configured to send the MA PDU session request to establish the MA PDU session to the HPLMN 100 over the second interface.

At step 908, the UE 300 receives the MA PDU session establishment accept message from the HPLMN 100 over the second interface. For example, in the UE 300 as illustrated in the FIG. 7, the communicator 320 can be configured to receives the MA PDU session establishment accept message from the HPLMN 100 over the second interface.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method performed by a home session management function (H-SMF) in a communication system, the method comprising:

receiving, from a visited public land mobile network (VPLMN) in the communication system, information on a multi access protocol data unit (MA PDU) session request for a user equipment (UE), wherein the UE is registered to the VPLMN over 3rd generation partnership project (3GPP) access and to a home public land mobile network (HPLMN) over non-3GPP access; and transmitting, to the UE, via the VPLMN, access traffic steering, switching and splitting (ATSSS) rules for the MA PDU session in case that an MA PDU session for the UE requested by the MA PDU session request was successfully established, wherein the ATSSS rules were derived by the H-SMF, wherein the ATSSS rules are included in an MA PDU session establishment accept message indicating that the MA PDU session was successfully established.

2. The method of claim 1, wherein ATSSS capability information of the UE is received.

3. The method of claim 1, wherein an N16 interface is used between a visited-SMF (V-SMF), in the VPLMN and the H-SMF.

4. The method of claim 1, wherein the MA PDU session establishment accept message further includes measurement assistance information.

5. A method performed by a visited session management function (SMF) (V-SMF) in a visited public land mobile network (VPLMN) of a communication system, the method comprising:

receiving, from a user equipment (UE), information on a multi access protocol data unit (MA PDU) session request for the UE registered to the VPLMN over 3rd generation partnership project (3GPP) access and to a home public land mobile network (HPLMN) over non-3GPP access;

transmitting, to a home SMF (H-SMF) in the communication system, information on the MA PDU session request; and receiving, from the H-SMF, access traffic steering, switching and splitting (ATSSS) rules for the MA PDU session; and transmitting, to the UE, the ATSSS rules, wherein the ATSSS rules are included in an MA PDU session establishment accept message indicating that an MA PDU session for the UE requested by the MA PDU session request was successfully established.

6. The method of claim 5, wherein the MA PDU session request includes an ATSSS capability information of the UE.

7. The method of claim 5, wherein an N16 interface is used between the V-SMF and the H-SMF.

8. The method of claim 5, wherein the ATSSS rules were derived by the H-SMF.

9. A method performed by a home public land mobile network (HPLMN) in a communication system, the method comprising:

receiving, from a visited public land mobile network (VPLMN) in the communication system, information on a multi access protocol data unit (MA PDU) session request for a user equipment (UE), wherein the UE is registered to the VPLMN over 3rd generation partnership project (3GPP) access and to a home public land mobile network (HPLMN) over non-3GPP access; and transmitting, to the UE via the VPLMN, access traffic steering, switching and splitting (ATSSS) rules for the MA PDU session in case that a MA PDU session for the UE requested by the MA PDU session request was successfully established, wherein the ATSSS rules were derived by a home session management function (H-SMF) in the HPLMN, wherein the ATSSS rules are included in an MA PDU session establishment accept message indicating that the MA PDU session was successfully established.

10. The method of claim 9, wherein subscription data is stored in a unified data management (UDM) of the HPLMN.

11. The method of claim 9, wherein home operator policy information is stored in a home policy control function (H-PCF) of the HPLMN.

12. The method of claim 9, wherein a home user plane function (H-UPF) in the HPLMN is an anchor point between the H-UPF and a visited user plane function (V-UPF) in the VPLMN.

13. The method of claim 9, wherein ATSSS capability information of the UE is received.

14. A method performed by a visited public land mobile network (VPLMN) in a communication system, the method comprising:

receiving, from a user equipment (UE), information on a multi-access protocol data unit (MA PDU) session request for the UE registered to the VPLMN over 3rd generation partnership project (3GPP) access and to a home public land mobile network (HPLMN) over non-3GPP access;

transmitting, to a home public land mobile network (HPLMN) in the communication system, information on the MA PDU session request;

receiving, from the HPLMN, access traffic steering, switching and splitting (ATSSS) rules for the MA PDU session; and transmitting, to the UE, the ATSSS rules, wherein the ATSSS rules are included in an MA PDU session establishment accept message indicating that an MA PDU session for the UE requested by the MA PDU session request was successfully established.

15. The method of claim 14, wherein the ATSSS rules were derived by a home session management function (H-SMF) in the HPLMN.

16. The method of claim 14, wherein an N16 interface is used between a visited session management function (SMF) (V-SMF) in the VPLMN and a home SMF (H-SMF) in the HPLMN.

17. A method performed by a user equipment (UE) in a communication system, the method comprising:

transmitting, to a visited public land mobile network (VPLMN), a multi-access protocol data unit (MA PDU) session request message for the UE, wherein the UE is registered to the VPLMN over 3rd generation partnership project (3GPP) access and to a home public land mobile network (HPLMN) over non-3GPP access; and receiving, from the VPLMN, an MA PDU session establishment accept message indicating that an MA PDU session requested by the MA PDU session request message was successfully established, wherein the MA PDU session establishment accept message includes an access traffic steering, switching and splitting (ATSSS) rules for the MA PDU session.

18. The method of claim 17, further comprising transmitting ATSSS capability information of the UE, and wherein the MA PDU session establishment accept message is received after transmission of the MA PDU session request message and transmission of the ATSSS capability information.

19. The method of claim 17, wherein the ATSSS rules were derived by a home session management function (H-SMF) in the HPLMN.

20. A user equipment (UE) in a communication system, the UE comprising:

a communicator; and a processor coupled with the communicator and configured to:
  transmit, to a visited public land mobile network VPLMN, a multi-access protocol data unit (MA PDU) session request message for the UE, wherein the UE is registered to the VPLMN over 3rd generation partnership project (3GPP) access and to a home public land mobile network (HPLMN) over non-3GPP access; and
  receive, from the VPLMN, an MA PDU session establishment accept message indicating that an MA PDU session requested by the MA PDU session request message was successfully established,
wherein the MA PDU session establishment accept message includes an access traffic steering, switching and splitting (ATSSS) rules for the MA PDU session.

21. The UE of claim 20, wherein the processor is further configured to transmit ATSSS capability information of the UE, and
  wherein the MA PDU session establishment accept message is received after transmission of the MA PDU session request and transmission of the ATSSS capability information.

22. The UE of claim 20, wherein the ATSSS rules were derived by a home session management function (H-SMF) in the HPLMN.

* * * * *